United States Patent
Krishnan

(10) Patent No.: US 11,620,712 B2
(45) Date of Patent: Apr. 4, 2023

(54) ACTIVITY-BASED COLLATERAL MODELING

(71) Applicant: FINOPTSYS, INC., Princeton, NJ (US)

(72) Inventor: Anand Krishnan, Princeton, NJ (US)

(73) Assignee: FINOPTSYS, INC., Hoboken, NJ (US)

(*) Notice: Subject to any disclaimer, the term of this patent is extended or adjusted under 35 U.S.C. 154(b) by 0 days.

(21) Appl. No.: 17/518,163

(22) Filed: Nov. 3, 2021

(65) Prior Publication Data

US 2022/0138858 A1    May 5, 2022

Related U.S. Application Data

(60) Provisional application No. 63/109,422, filed on Nov. 4, 2020.

(51) Int. Cl.
*G06Q 40/06* (2012.01)
*G06F 9/451* (2018.01)
*G06Q 10/067* (2023.01)
*G06Q 10/06* (2023.01)

(52) U.S. Cl.
CPC ............. *G06Q 40/06* (2013.01); *G06F 9/451* (2018.02); *G06Q 10/067* (2013.01)

(58) Field of Classification Search
CPC .............................. G06Q 40/06; G06Q 10/067
USPC ...................................................... 705/35–45
See application file for complete search history.

(56) References Cited

U.S. PATENT DOCUMENTS 11,216,895 B1 * 1/2022 Schwartz .............. G06F 16/248
2021/0201328 A1 * 7/2021 Gunther ............. G06Q 20/4016

* cited by examiner

*Primary Examiner* — Robert R Niquette
(74) *Attorney, Agent, or Firm* — Lando & Anastasi, LLP

(57) ABSTRACT

Techniques for performing activity-based collateral modeling (ABCM) analysis are disclosed, including: obtaining portfolio data; obtaining multiple ranked criteria for cross-asset utilization; performing an ABCM analysis on the portfolio data according to the ranked criteria for cross-asset utilization, to obtain a set of one or more recommended transactions; receiving user input indicating a decision to execute a transaction in the set of one or more recommended transactions; and responsive to the user input, updating the ABCM analysis to reflect the decision to execute the transaction.

17 Claims, 16 Drawing Sheets

| USE CATEGORY | TOTALS |
|---|---|
| FIRM SHORT | 2,799,993,854 |
| INDEX SHORT | 665,000,776 |
| LOAN VS CASH | 2,903,367,745 |
| LOAN VS NONCASH | 1,151,839,480 |
| PENDING SELL | 659,211 |
| REPO | 9,114,602,955 |
| SELL | 5,417,529 |
| SWAP SHORT | 1,106,001,615 |
| TOTALS | 18,006,903,194 |

Customise ABCM Ranking

| | ABCM Source | Rank | ABCM Use |
|---|---|---|---|
| 01 | Firm Long | 01 | Firm Short |
| | | 02 | Index Short |
| | | 03 | Swap Short |
| | | 04 | Pending Sell |
| | | 05 | Sell |
| | | 06 | PB Short |
| | | 07 | PB Margin Delivered |
| | | 08 | CCP Margin Delivered |
| | | 09 | SIMM Margin Delivered |
| | | 010 | Bilateral Margin Delivered |
| | | 011 | Triparty Margin Delivered |
| | | 012 | Loan vs Noncash |
| | | 013 | Loan vs Cash |
| | | 014 | Repo |
| | | 015 | Collateral Use |
| | | 016 | Unmapped Use |
| 02 | ABCM Source | Rank | ABCM Use |
| | Recall | 01 | Loan vs Cash |
| | | 02 | Loan vs Noncash |
| | | 03 | Repo |

Inefficiencies Configuration

Re-Rate
- Loan Threshold(BPS): 50
- Borrow Threshold(BPS): 100

Price
- Source Rate: 1.65 — 0.3(COF)
- Use Rate: 1.85 — 0.3(COF)

Corporate Actions
- Number of Days to Record Date: 6

[Cancel] [Apply Changes]

FIG. 14

ACTIVITY-BASED COLLATERAL MODELING

CROSS-REFERENCE TO RELATED APPLICATION

This application claims the benefit of U.S. Provisional Patent Application Ser. No. 63/109,422, titled "ACTIVITY-BASED COLLATERAL MODELING," filed Nov. 4, 2020, which is hereby incorporated by reference.

BACKGROUND

Institutional clients such as pension funds, asset managers, insurance companies, banks, hedge funds, etc., have dynamic and ever-changing securities financing and broader financial demands. However, these institutions typically use different software for different financial products and service provisions. For example, typical approaches book securities lending, repo, and swaps in different systems, making it very difficult to monitor key metrics such as collective credit risk and exposure, balance sheet usage, or duration, with respect to a counterparty trading all three products. In addition, different groups and/or internal departments (e.g., risk, treasury, trading desk, portfolio management, etc.) often use different systems that are not able to communicate with each other. Cross-system opacity can result in users in each group making inefficient and/or time-delayed decisions at an organizational level, thus harming the organization's bottom line.

Approaches described in this section have not necessarily been conceived and/or pursued prior to the filing of this application. Accordingly, unless otherwise indicated, approaches described in this section should not be construed as prior art.

TECHNICAL FIELD

The present disclosure relates generally to activity-based collateral modeling (ABCM).

SUMMARY

In general, in one aspect, one or more non-transitory computer-readable media store instructions that, when executed by one or more processors, cause the one or more processors to perform operations including: obtaining portfolio data; obtaining multiple ranked criteria for cross-asset utilization; performing an activity-based collateral modeling (ABCM) analysis on the portfolio data according to the ranked criteria for cross-asset utilization, to obtain a set of one or more recommended transactions; receiving user input indicating a decision to execute a transaction in the set of one or more recommended transactions; and responsive to the user input, updating the ABCM analysis to reflect the decision to execute the transaction.

The operations may further include: applying an extract-transform-load process to the portfolio data, to obtain normalized portfolio data. The operations may further include: assigning multiple tags, respectively, to multiple portfolio line items in the portfolio data, according to activity types associated with the multiple portfolio line items, the ABCM analysis being configured to reference the multiple tags. The set of one or more recommended transactions may include at least one transaction that solves for one or more inefficiencies. The operations may further include allocating assets in the portfolio data to liabilities in the portfolio data, using a waterfall approach in which a first allocation affects a second allocation and the second allocation affects a third allocation.

Receiving the user input may include: presenting a graphical user interface (GUI) that represents the portfolio data across multiple user-selectable dimensions and presents the set of one or more recommended transactions; and detecting a user selection of the transaction via the GUI. The GUI may include a heat map representation of the portfolio data across the plurality of user-selectable dimensions.

In general, in one aspect, a system includes at least one device including a hardware processor. The system is configured to perform operations including: obtaining portfolio data; obtaining multiple ranked criteria for cross-asset utilization; performing an activity-based collateral modeling (ABCM) analysis on the portfolio data according to the ranked criteria for cross-asset utilization, to obtain a set of one or more recommended transactions; receiving user input indicating a decision to execute a transaction in the set of one or more recommended transactions; and responsive to the user input, updating the ABCM analysis to reflect the decision to execute the transaction.

The operations may further include: applying an extract-transform-load process to the portfolio data, to obtain normalized portfolio data. The operations may further include: assigning multiple tags, respectively, to multiple portfolio line items in the portfolio data, according to activity types associated with the multiple portfolio line items, the ABCM analysis being configured to reference the multiple tags. The set of one or more recommended transactions may include at least one transaction that solves for one or more inefficiencies. The operations may further include allocating assets in the portfolio data to liabilities in the portfolio data, using a waterfall approach in which a first allocation affects a second allocation and the second allocation affects a third allocation.

Receiving the user input may include: presenting a graphical user interface (GUI) that represents the portfolio data across multiple user-selectable dimensions and presents the set of one or more recommended transactions; and detecting a user selection of the transaction via the GUI. The GUI may include a heat map representation of the portfolio data across the plurality of user-selectable dimensions.

In general, in one aspect, a method includes: obtaining portfolio data; obtaining multiple ranked criteria for cross-asset utilization; performing an activity-based collateral modeling (ABCM) analysis on the portfolio data according to the ranked criteria for cross-asset utilization, to obtain a set of one or more recommended transactions; receiving user input indicating a decision to execute a transaction in the set of one or more recommended transactions; and responsive to the user input, updating the ABCM analysis to reflect the decision to execute the transaction.

The method may further include: applying an extract-transform-load process to the portfolio data, to obtain normalized portfolio data. The method may further include: assigning multiple tags, respectively, to multiple portfolio line items in the portfolio data, according to activity types associated with the multiple portfolio line items, the ABCM analysis being configured to reference the multiple tags. The set of one or more recommended transactions may include at least one transaction that solves for one or more inefficiencies. The method may further include allocating assets in the portfolio data to liabilities in the portfolio data, using a waterfall approach in which a first allocation affects a second allocation and the second allocation affects a third allocation.

Receiving the user input may include: presenting a graphical user interface (GUI) that represents the portfolio data across multiple user-selectable dimensions and presents the set of one or more recommended transactions; and detecting a user selection of the transaction via the GUI. The GUI may include a heat map representation of the portfolio data across the plurality of user-selectable dimensions.

In general, in one aspect, one or more non-transitory computer-readable media store instructions that, when executed by one or more processors, cause the one or more processors to perform operations that include performing activity-based collateral modeling (ABCM) analysis in a single, customizable system that integrates analytical, decision-making, and execution modules across a value chain using a real-time or near real-time feedback loop.

In general, in one aspect, a system includes at least one device including a hardware processor. The system is configured to perform operations that include performing activity-based collateral modeling (ABCM) analysis in a single, customizable system that integrates analytical, decision-making, and execution modules across a value chain using a real-time or near real-time feedback loop.

In general, in one aspect, a method includes performing activity-based collateral modeling (ABCM) analysis in a single, customizable system that integrates analytical, decision-making, and execution modules across a value chain using a real-time or near real-time feedback loop.

One or more embodiments described in this Specification and/or recited in the claims may not be included in this General Overview section.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures:

FIGS. 3-14 illustrate examples of graphical user interfaces and corresponding functionality according to an embodiment;

DETAILED DESCRIPTION

Figure 1:
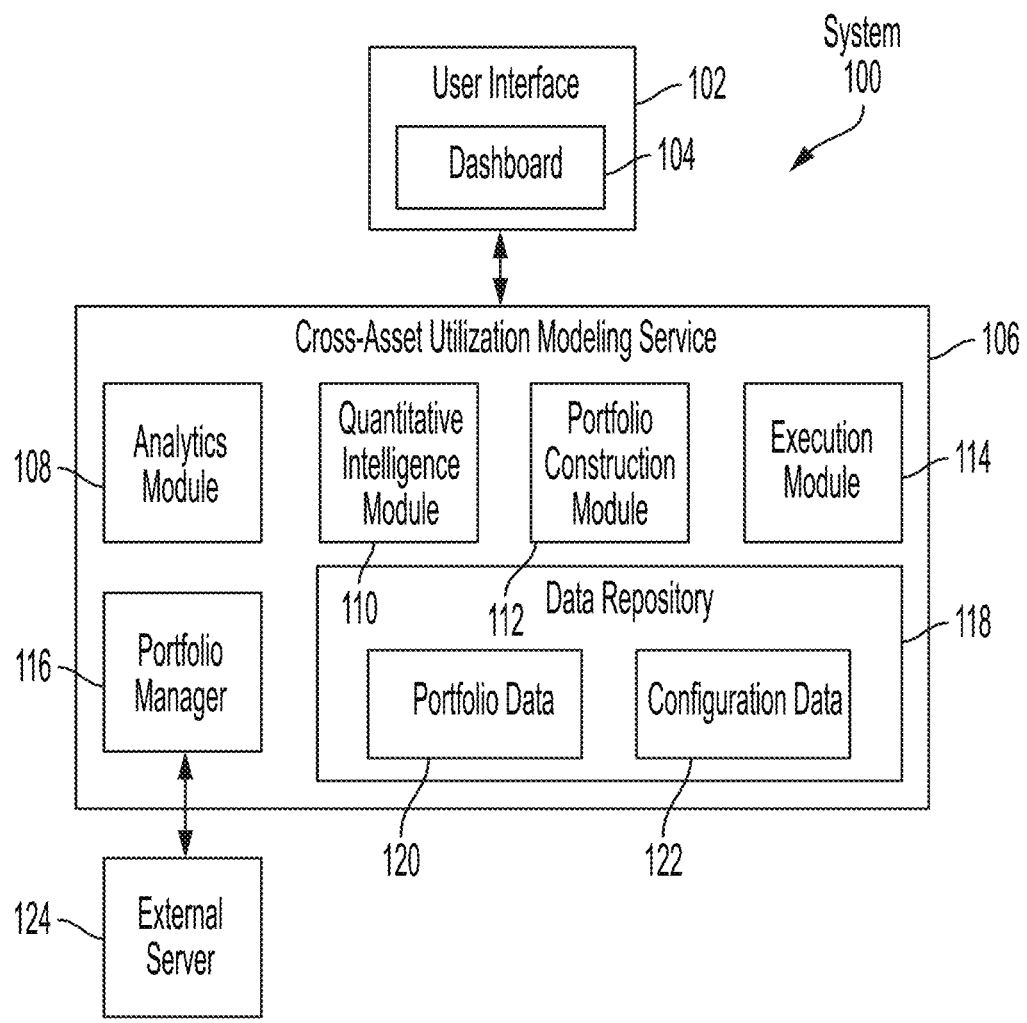
FIG. 1 is a block diagram of an example of a system according to an embodiment.

One or more embodiments include an efficient, transparent, analytical, and customized cross-asset utilization solution for assets deployed in the securities financing business. Techniques described herein may be used to address dynamic and ever-changing demands of a diverse institutional client base, such as pension funds, asset managers, insurance companies, banks, hedge funds, etc. One or more embodiments include a financial optimization application that provides a technical improvement over prior approaches. Using customized solutions, each client may be able to derive sophisticated investment decisions for their own portfolios, while adhering to their own constraints. Techniques described herein include connectivity between clients/counterparties, to optimize their asset utilization in a "real-time" manner. Thus, one or more embodiments address inefficiencies in the existing securities financing market.

In an embodiment, techniques described herein employ modules through the entire value chain, ranging from analytics to decision-making to portfolio construction. Transaction executions and operations are interconnected with a direct feedback loop and "real-time" internal updating process, showing pro forma outcomes and business impacts for the client's portfolio and inventory. Thus, one or more embodiments provide a technical improvement over prior approaches that allows clients to better understand their decision and corresponding financial and commercial impacts.

In an embodiment, techniques described herein provide various metrics like notional, balance sheet, duration, and estimated profit and loss (P&L). A system described herein may be configured to attribute each metric, based on ABCM analysis rules/criteria, with results being available in real-time or near real-time. For example, a trader or controller may use a system described herein to monitor estimated P&L and balance sheet usage, as soon as the activity is performed and analyzed using ABCM analysis.

In an embodiment, techniques described herein overcome the prohibitive nature of working across disparate systems and spreadsheets. For example, techniques described herein provide a significant performance improvement over prior approaches, by overcoming communication gaps (i.e., systems that are unable to communicate with each other) and delays (i.e., systems that are unable to communicate with each other in real time). Analytical outcomes may be based, in part, on client-determined and customizable input variables, objectives, and constraints, rather than only static and predefined criteria. In addition, techniques described herein may be used to perform "what-if" analysis for clients in a matter of seconds (in contrast to prior approaches that may require hours or days to prepare).

Techniques described herein provide a technical improvement over prior approaches that use different software for different financial products. For example, typical approaches book securities lending, repo, and swaps in different systems, making it very difficult to monitor key metrics such as collective credit risk and exposure, balance sheet usage, or duration, with respect to a counterpart trading all three products. In addition, different groups and/or internal departments (e.g., risk, treasury, trading desk, etc.) often use different systems that are not able to communicate with each other. Cross-system opacity can result in users in each group making inefficient and/or time-delayed decisions at an organizational level, thus harming the organization's bottom line. Techniques described herein provide an integrated system that provides a standard view of collateral, across multiple products, that can be used by different user groups within the organization. The standard view includes multiple dimensions and metrics, based on ABCM analysis as described herein. The system may thus be configured to identify inefficiencies in a multi-dimensional manner including, for example, a firm's internal organizational, product, department, service, and/or regional levels, as well as different "C" categories referenced by ABCM (i.e., collateral optimization and inefficiency elimination, cash, capital, client, credit, and/or counterparty criteria). These criteria may be substituted flexibly based on the client's preferences and objectives, allowing the system to solve for inefficiencies and/or optimize key performance indicators (KPIs) with high precision for any one or even multiple "Cs." In contrast, prior approaches typically only look at assets and liabilities in a single dimension.

In general, techniques described herein provide a unique and holistic approach that combines analytical, decision-making, and execution features into a single, customizable platform. In an embodiment, ABCM is a core component of the platform, consolidating these features in a client-customizable and real-time or near real-time manner.

1. System

FIG. 1 is a block diagram of an example of a system 100 according to an embodiment. In an embodiment, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

As illustrated in FIG. 1, the system 100 includes a cross-asset utilization modeling service 106. A cross-asset utilization modeling service 106 refers to hardware and/or software configured to perform operations described herein for cross-asset utilization modeling. Examples of operations for cross-asset utilization modeling are described below.

As illustrated in FIG. 1, the cross-asset utilization modeling service 106 may include various modules. Depending on the scope of the subscription and license, clients onboarded to the cross-asset utilization modeling service 106 may have access to some or all of the modules, as discussed in further detail below with respect to FIG. 3. Thus, one or more embodiments provide a holistic and full value chain offering not available in prior approaches. Typical prior approaches require multiple internal and external systems and vendors, in systems that often are unable to connect and communicate with each other.

In an embodiment, the cross-asset utilization modeling service 106 includes a portfolio manager 116. The portfolio manager 116 is configured to obtain portfolio data from one or more sources. For example, an automated data feed/batch process (e.g., from one or more custodians and/or client internal systems) may use straight-through processing (STP) to obtain portfolio data. Alternatively or additionally, the portfolio manager 116 may support manual upload and/or consolidation of multiple files (e.g., start of day positions, margin, equity and fixed income trades, repos, swaps, index files, etc.). Manual uploads and/or consolidations may be performed a client's discretion, e.g., responsive to user input.

In an embodiment, the cross-asset utilization modeling service 106 includes an analytics module 108. The analytics module 108 is configured to perform activity-based collateral modeling (ACBM) analytics. ACBM analytics provide real-time, or near real-time, analytics with a detailed view into how collateral is sourced and utilized. As described below, activities initiated based on ABCM analysis provide input to a real-time or near real-time feedback loop.

In an embodiment, the ABCM model provided by the analytics module 108 is based on activity-based costing (ABC), an accounting principle and costing method that identifies activities in an organization and assigns the cost of each activity to all products and services according to the actual consumption by each. This model assigns more indirect costs (overhead) into direct costs compared to conventional costing. With ABC, a company may estimate the cost elements of entire products, activities, and services, which may in turn help inform a company's decision-making processes. Specifically, ABC may help a company decide to: (a) identify and eliminate those products and services that are unprofitable and lower the prices of those that are overpriced (product and service portfolio aim); and/or identify and eliminate production or service processes that are ineffective and allocate processing concepts that lead to the same product at a better yield (process re-engineering aim).

In a business organization, an ABC methodology may assign an organization's resource costs through firm internal analytical and business optimization (e.g., structure, process, and/or process management) activities to the products and services provided to its customers. Historically, ABC has been used as a tool for understanding product and customer cost and profitability, based on the production or performing processes. Thus, ABC has predominantly been used to support strategic decisions such as pricing, outsourcing, identification, and measurement of process improvement initiatives. Techniques described herein apply an ABC method for collateral (versus costs) purposes, thus providing an improved, unique approach to understanding a company's book and inventory, also translating ABC goals and decisions into the securities financing business.

In an embodiment, the cross-asset utilization modeling service 106 includes a quantitative intelligence (QI) module 110. The QI module 110 may include decision-making that executes upon completion of ABCM operations described herein. Based on client-specific objectives (e.g., maximize yield, minimize costs, minimize balance sheet, etc.) and client-specific constraints (e.g. limits on assets, duration, etc.), the QI module 110 may generate outputs corresponding to transaction opportunities that align with the client's predefined objectives. Alternatively or additionally, the QI module 110 may include inventory optimization that analyzes one or more portfolios or baskets and their characteristics regarding factors such as P&L, internalization impacts, etc.

In an embodiment, the cross-asset utilization modeling service 106 includes a portfolio construction module 112. The portfolio construction module 112 may be configured to construct collateral baskets. Specifically, upon user input of basket-specific determination factors, the portfolio construction module 112 may automate and optimize the creation of corresponding collateral baskets. This automated process is time-efficient when compared with prior approaches that depend on time-consuming manual processes. The portfolio construction module 112 may be configured to customize created baskets to address potential constraints, such as constraints around shortfalls, restricted positions, etc.

In an embodiment, the cross-asset utilization modeling service 106 includes an execution module 114. Upon completion of analytics, decision-making, and portfolio construction operations described herein, transactions such as recalls or returns may be submitted via a trading queue. For other new transactions to be initiated (e.g., borrows or loans, repos, swaps, etc.), clients can submit and negotiate indications of interest (IoI) with specific counterparties, in a bilateral/peer-to-peer approach. For liquidity management purposes, the system 100 may also be configured to automatically calculate cash flow impacts for transactions in the queue. Where applicable (e.g. for short sales), "locate" requirements for securities may also be covered.

In an embodiment, the cross-asset utilization modeling service 106 stores portfolio data 120. The portfolio data includes data that describes the client's inventory (e.g., a restricted stock list, start of day files, security position holdings, etc.).

In an embodiment, the cross-asset utilization modeling service 106 stores configuration data 122. Configuration data 122 includes information about user/client-specific configurations. For example, configuration data 122 may include criteria for determining inefficiencies, ABCM rankings, the firm's cost of funding rate or start-of-day cash position, firm-specific criteria for hard-to-borrow (HTB) equities, restricted lists, contract-specific counterparty details, etc.

In an embodiment, a data repository 118 is any type of storage unit and/or device (e.g., a file system, database, collection of tables, or any other storage mechanism) for storing data. A data repository 118 may include multiple different storage units and/or devices. The multiple different storage units and/or devices may or may not be of the same type or located at the same physical site. Further, a data repository 118 may be implemented or may execute on the same computing system as one or more other components of the system 100. Alternatively or additionally, a data repository 118 may be implemented or executed on a computing system separate from one or more other components of the system 100. A data repository 118 may be logically integrated with one or more other components of the system 100. Alternatively or additionally, a data repository 118 may be communicatively coupled to one or more other components of the system 100 via a direct connection or via a network. In FIG. 1, a data repository 118 is illustrated as storing various kinds of information. Some or all of this information may be implemented and/or distributed across any of the components of the system 100. However, this information is illustrated within the data repository 118 for purposes of clarity and explanation.

In an embodiment, the cross-asset utilization modeling service 106 is configured to communicate with one or more external servers 124, to obtain portfolio data 120. For example, an external server 124 may be a server managed by a bank, brokerage, fund manager, or other financial institution. The cross-asset utilization modeling service 106 may communicate with the external server 124 using credentials supplied by a user of the cross-asset utilization modeling service 106.

Data provided by an external server 124 may not be available in a format that is directly usable by the cross-asset utilization modeling service 106. Accordingly, the cross-asset utilization modeling service 106 may be configured to execute an extract-transform-load (ETL) process to data from the external server 124. ETL extracts data (from homogeneous and/or heterogeneous sources), converts and standardizes the data (e.g., using one or more data cleaning and/or transformation operations) into a format/structure that the cross-asset utilization modeling service 106 can use directly for querying and analysis, and loads the data into target storage (e.g., a data repository 118), in some cases without requiring any further enhancement and/or amending of the data by the client. This process provides a technical improvement over prior approaches that are limited by internal compartmentalization of data across external vendors and suppliers. Without such a process, the burden of gathering and processing the data may be prohibitive.

In an embodiment, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In an embodiment, a user interface 102 refers to hardware and/or software configured to facilitate communications between a user and the cross-asset utilization modeling service 106. For example, the user interface 102 may include a dashboard 104 that provides access to one or more modules of the cross-asset utilization modeling service 106 described herein. In an embodiment, the dashboard 104 is a management interface that provides a holistic overview, on an aggregated firm level, across multiple books and assets. Access to the dashboard 104 may be limited to specific users and/or user groups. For example, at a client's discretion, access may be limited to senior users (e.g. executives, treasurers, etc.) who require a consolidated summary and insight for firmwide decision-making, monitoring, and other purposes. Some examples are described below with respect to FIGS. 3-14.

A user interface 102 renders user interface elements and receives input via user interface elements. A user interface 102 may be a graphical user interface (GUI), a command line interface (CLI), a haptic interface, a voice command interface, and/or any other kind of interface or combination thereof. Examples of user interface elements include checkboxes, radio buttons, dropdown lists, list boxes, buttons, toggles, text fields, date and time selectors, command lines, sliders, pages, and forms. Different components of a user interface 102 may be specified in different languages. The behavior of user interface elements may be specified in a dynamic programming language, such as JavaScript. The content of user interface elements may be specified in a markup language, such as hypertext markup language (HTML), Extensible Markup Language (XML), or XML User Interface Language (XUL). The layout of user interface elements may be specified in a style sheet language, such as Cascading Style Sheets (CSS). Alternatively or additionally, aspects of a user interface 102 may be specified in one or more other languages, such as Java, Python, Perl, C, C++, and/or any other language or combination thereof.

2. Operations for Cross-Asset Utilization Modeling

Figure 2:
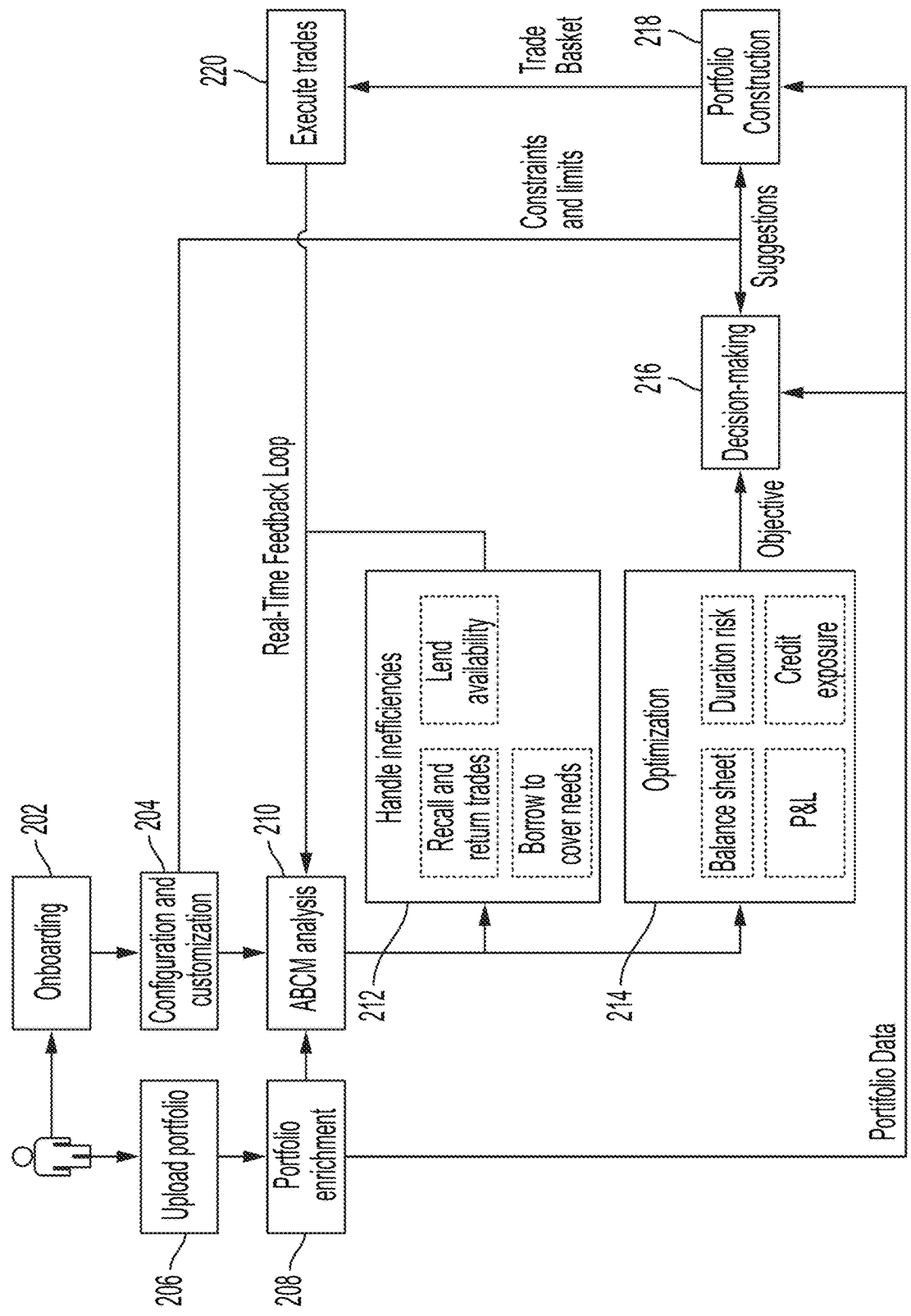
FIG. 2 is a flow diagram of an example of operations for asset-based collateral modeling according to an embodiment.

FIG. 2 is a flow diagram of an example of operations for cross-asset utilization modeling according to an embodiment. One or more operations illustrated in FIG. 2 may be modified, rearranged, or omitted all together. Accordingly, the particular sequence of operations illustrated in FIG. 2 should not be construed as limiting the scope of one or more embodiments. In the following discussion, a "system" may refer to one or more components of a system as illustrated in FIG. 1.

In an embodiment, the system onboards a client (Operation 202). Onboarding may include creating a client account and obtaining general information about the client, such as login and password, etc. In addition, the system may configure and customize the client account (Operation 204). Configuring and customizing the client account may include obtaining client-specific information about the services to be provided, such as objectives, credentials for obtaining portfolio data, etc. Customization may include receiving user input to configure settings in a manner that differs from default settings (e.g., ACBM rankings for criteria, criteria for determining inefficiencies, etc.).

In an embodiment, a client uploads one or more portfolios (Operation 206). The client may upload one or more portfolios in many different ways. For example, the client may upload one or more spreadsheets with portfolio data, via a user interface. Alternatively or additionally, the client may provide credentials to obtain portfolio data from one or more financial institutions and/or other source(s). The system may be configured to obtain portfolio data automatically using a "pull" approach, for example, based on a predetermined schedule (e.g., hourly, daily, etc.). Alternatively or additionally, the system may be configured to receive portfolio data according to a "push" model, whereby the system is notified when new portfolio data is available.

In addition to uploading portfolio data, the system may be configured to normalize data sets to a particular standard used by the system, to ensure that the data is in a format suitable for further processing as described herein. As discussed above, the system may apply an extract-transform-load (ETL) process to data from an external server. ETL extracts data (from homogeneous and/or heterogeneous sources), converts and standardizes the data (e.g., using one or more data cleaning and/or transformation operations) into a format/structure that the system can use directly for querying and analysis, and loads the data into target storage, in some cases without requiring any further enhancement and/or amending of the data by the client.

In an embodiment, the system performs portfolio enrichment (Operation 208). In some cases, uploaded portfolios or content may not suffice for the system to provide full analytical and other functions. Portfolio enrichment may include applying default assumptions. As an example of a default assumption, a stock ticker may be provided without a country appendix. Enrichment may assume, by default, that it is a United States (U.S.) security (e.g., Microsoft-→MSFT→MSFT.US). As another example of a default assumption, if a currency field is left blank, enrichment may assume the home currency indicated in firm setup during onboarding (e.g., U.S. dollars (US) for a U.S. firm).

Portfolio enrichment may further include pulling data from other external sources/third party vendors. For example, clients may use existing data files available in their infrastructure environment, such as: market data files from Bloomberg or Reuters/Refinitiv; rating data from Moody's, Standard & Poor's, or Fitch; and/or security-specific data pulled from client vendors, custodians, agent lender firms, etc.

Portfolio enrichment may further include receiving user input by which clients provide additional and customizable input, depending on their needs and requirements. For example, a client may define company- and/or organization-specific parameters and thresholds such as high-quality liquid assets (HQLA), liquidity coverage ratio (LCR), and/or security classifications such as hard-to-borrow (HTB).

Based on a client's configuration, customizations (if any), and portfolio (optionally enriched), the system performs ABCM analysis (Operation 210). Using a real-time feedback loop based on activity, as illustrated in FIG. 2, the system may perform ABCM analysis every time an activity such as a new trade, recalling or returning an existing trade, etc. is performed within the system. Accordingly, the system may perform ABCM analysis potentially hundreds of time during a day (in contrast to prior approaches that do not perform real-time analysis and only analyze portfolios on a less frequent basis). The system may include asynchronous parallel processing to handle the load of performing ABCM analysis so frequently. Processing resources may be scalable upward or downward, depending on the client's portfolio size and/or other factors.

As illustrated in FIG. 2, one or more embodiments include interconnectivity and interdependency between modules in real time or near real-time. Accordingly, the system is able to provide pro forma outcomes of action that users and employees of the client's organization have been engaged in. Using the feedback loop illustrated in FIG. 2, the system may compute impacts on all levels, such as assets and inventory (notional), profitability (P&L; return on notional (RoN)), balance sheet, etc.

In an embodiment, the system identifies and handles inefficiencies (Operation 212). As described in further detail below, criteria for determining inefficiencies may be user-configurable. Inefficiencies may relate, for example, to price, corporate action, balance sheet, individual positions, liquidity, maturity, and/or one or more other factors. Inefficiencies may include one or more of:

1. Re-rate inefficiency. Re-rate inefficiency may be derived from the difference between Trade Rate and Market Rate being higher (or lower) than the loan (or borrow) threshold (e.g., in basis points (bps)).
2. Price inefficiency. Price inefficiency may be based, for example, on the cost of funds being lower than a source rate or higher than a use rate.
3. Corporate action inefficiency. Corporate action inefficiency may be based, for example, on an upcoming corporate action. For example, securities may be included or excluded if a corporate action will occur within a specific time frame. The system may provide clients with the discretion to flexibly choose that time frame, for example, based on the number of days to the record date of the upcoming corporate action. Because such upcoming corporate actions may affect, for example, the price of a security, they may be deemed inefficient.
4. Balance sheet inefficiency. Balance sheet inefficiency may be based, for example, on cash-related transactions. In general, the system may be configured to tag all securities that consume balance sheet, as defined by Basel IV and/or other regulations, requirements, or standards.
5. (SI). Stock loan inefficiency (needs) derived from pending sales or recalls.
6. Liquidity inefficiency. Liquidity inefficiency may be based, for example, on insufficient high-quality liquid assets (HQLA).
7. Maturity inefficiency. Maturity inefficiency may be based, for example, on trade maturing in a particular timeframe (e.g., on the current date).

As illustrated in FIG. 2, identified inefficiencies may be handled in many different ways, which may include and are not limited to: recalling and returning trades; borrowing to cover needs; and/or borrowing based on lend availability. In some examples, inefficiencies can be actioned by clients at their discretion. As an example, if the system identifies unencumbered assets in the box (the "box" here referring to an inventory or queue of all unencumbered assets, i.e., all notional asset volume of availabilities and needs not yet deployed for securities lending purposes), a client may choose to create a loan, or may decide not to take any action on such an inefficiency. As another example, a client may not need to recall or return securities for which an inefficient source or use rate (compared to the cost of funding) has been identified.

In an embodiment, the system presents (e.g., in a user interface) one or more optimization potentials (Operation 214). As illustrated in FIG. 2, optimization potentials may be presented (and optionally actioned) in a variety of ways, which may include and are not limited to: balance sheet (e.g., minimizing balance sheet exposure to lower capital requirements); P&L (e.g., focused on maximizing yield or minimizing costs); duration risk (e.g., lowering duration risk and exposure from long-term to short-term); and credit exposure (e.g., by counterparty or security, choosing low credit risk over high risk). For example, based on a client's preferences and objectives (which may be customized via an ABCM ranking feature as described herein) for each position and exposure, a corresponding metric impact may be shown (e.g., positive or negative P&L, return on notional volume, or a duration gap). Balance sheet exposure is another example where clients with corresponding constraints may want to prefer consideration of non-cash transactions. Such analytics enable clients to derive informed decisions for upcoming transactions to be made.

In an embodiment, based at least in part on a client objective, the system performs decision-making (Operation 216). Specifically, decision-making may include generating suggestions of potential opportunities for the client's portfolio. Once the above-mentioned analytical aspects are taken into consideration and factored in (e.g., setting up all objectives and constraints, determining relevant ABCM criteria and rankings, position and counterparty limits and/or preferences, etc.), the system may be configured to provide algorithmic tools and optimized output, including transaction-specific decision-making options.

Since transactions may have different impacts on a client's portfolio and their objectives, the decision-making process provides selection criteria for clients to choose from (e.g., a focus on cash as a criterion may identify new funding or reinvestment opportunities, whereas a focus on capital may attempt to minimize balance sheet exposure). In an embodiment, users can also set a preference on their existing clients or counterparties, via a client scoring tool that provides a client ranking with subsequent allocation of proposed transactions based on such ranks. As illustrated in FIG. 2, decision-making may be further based on constraints and limits imposed by the client configuration and customization.

In an embodiment, the system performs portfolio construction (Operation 218). Optimization potential and suggestions made via decision-making may occur on a single security and transaction basis and/or may be made for multiple securities (i.e., for a portfolio), e.g., for index trading purposes and/or to create collateral baskets with multiple (potentially numerous) constituents. For many transactions in the securities financing business, the provision of collateral is required. Portfolio construction provides users an opportunity to construct collateral baskets for numerous strategies (e.g., repos, swaps, stock loan, or index), which can be attached to corresponding transactions for review by counterparties, negotiation, etc.

In an embodiment, the system executes trades (Operation 220). To execute trades, once transactions are identified and constructed, the system may route them off-platform, e.g., to one or more external trading platforms, for execution, clearing, and settlement. The system may thus allow for negotiation of trades for off-platform execution. Alternatively or additionally, the system may be configured to execute trades on-platform, in which case the system may route the trades to an on-platform execution module configured to execute trades. Clients may submit indications of interest (IoI) and negotiate certain transaction features with counterparties in a bilateral manner. For certain transactions, additional features and support functions may be embedded (e.g., a pricing tool for repos, a locate engine for short sales, etc.). Actions (e.g., suggested actions and/or user-specified actions) selected for execution may be placed in a trading queue and executed in queue order.

As noted above, certain actions taken in the system feed back into ABCM analysis (Operation 210) in real-time or near real-time. The system may be configured to update all applicable modules on a real-time or near-real-time basis. The arrows in FIG. 2 illustrate a full-value chain feedback loop, where any initiated transaction, amended objective or constraint, or change of inefficiency preferences by a client (e.g., based on customer discretion and optionally with one or more customizations permitted by the system) is promptly reflected throughout the system with the output amending and updating ABCM analysis. This feedback loop is possible because of the interconnectedness of the modules. Thus, one or more embodiments allow for real-time or near-real-time ABCM updating, compared with prior approaches that require clients to wait for an overnight data feed or other intra-day feedback where input is sent back to them by third parties and/or their own infrastructure system.

3. Detailed Examples

Detailed examples are described below for purposes of clarity. Components and/or operations described below should be understood as examples that may not be applicable to one or more embodiments. Accordingly, components and/or operations described below should not be construed as limiting the scope of one or more embodiments. In the following examples, a "system" may refer to one or more components of a system as illustrated in FIG. 1.

Figure 3:
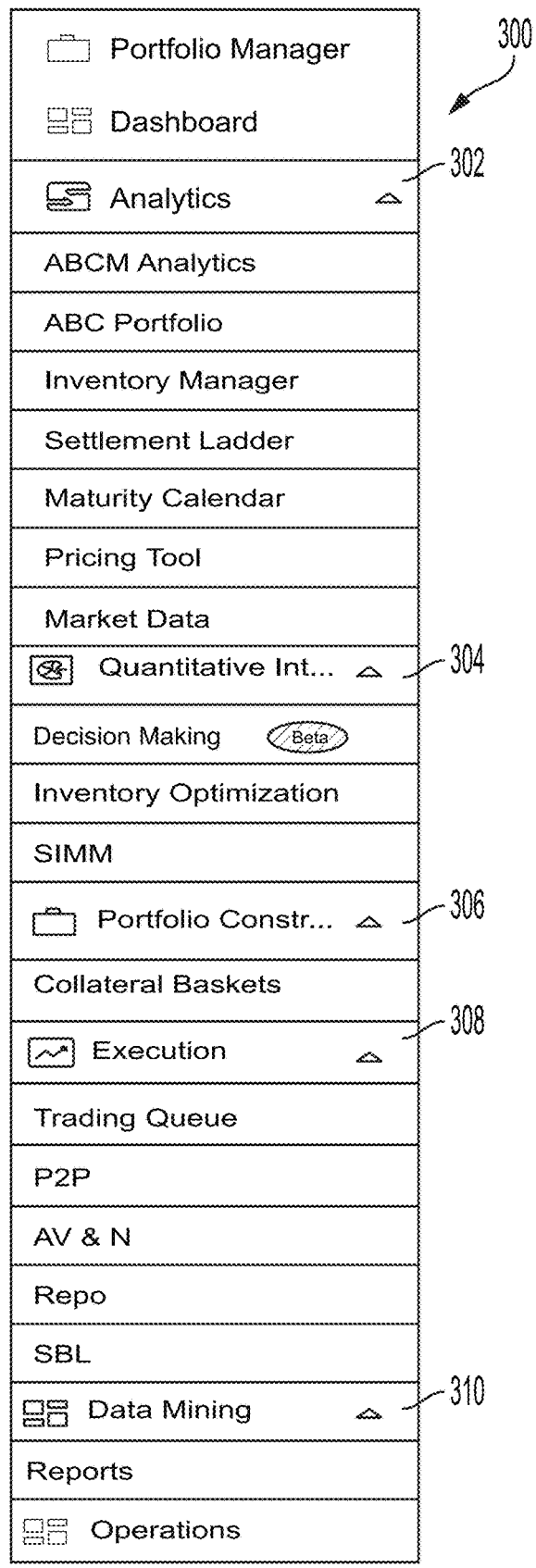

FIG. 3 illustrates an example of a graphical user interface that includes a table of contents (TOC) style layout 300 for accessing one or more system modules that are enabled for a current user. The system may include a logical, intuitive process and "walk-through" of the available modules. As illustrated in FIG. 3, the process may start with an analytics module 302 and proceed through a quantitative intelligence module 304 (including, for example, decision-making), a portfolio construction module 306, and an execution module 308. In this example, the menus for each module are expanded to expose access to various features of each module. A data mining module 310 provides access to reports that provide insights into the underlying data. Operations performed by various modules are described in further detail herein.

Figure 4:
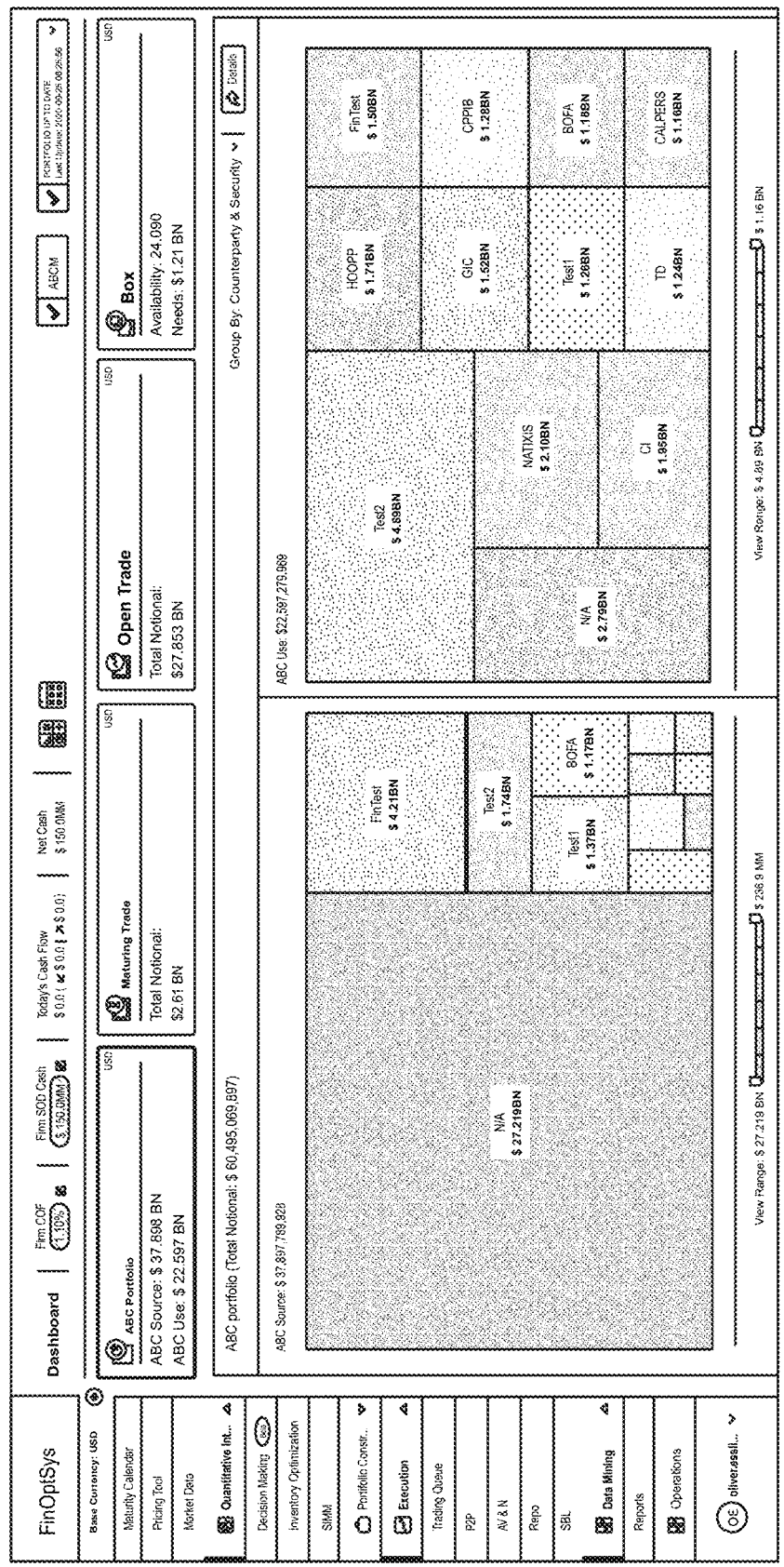
Figure 6:
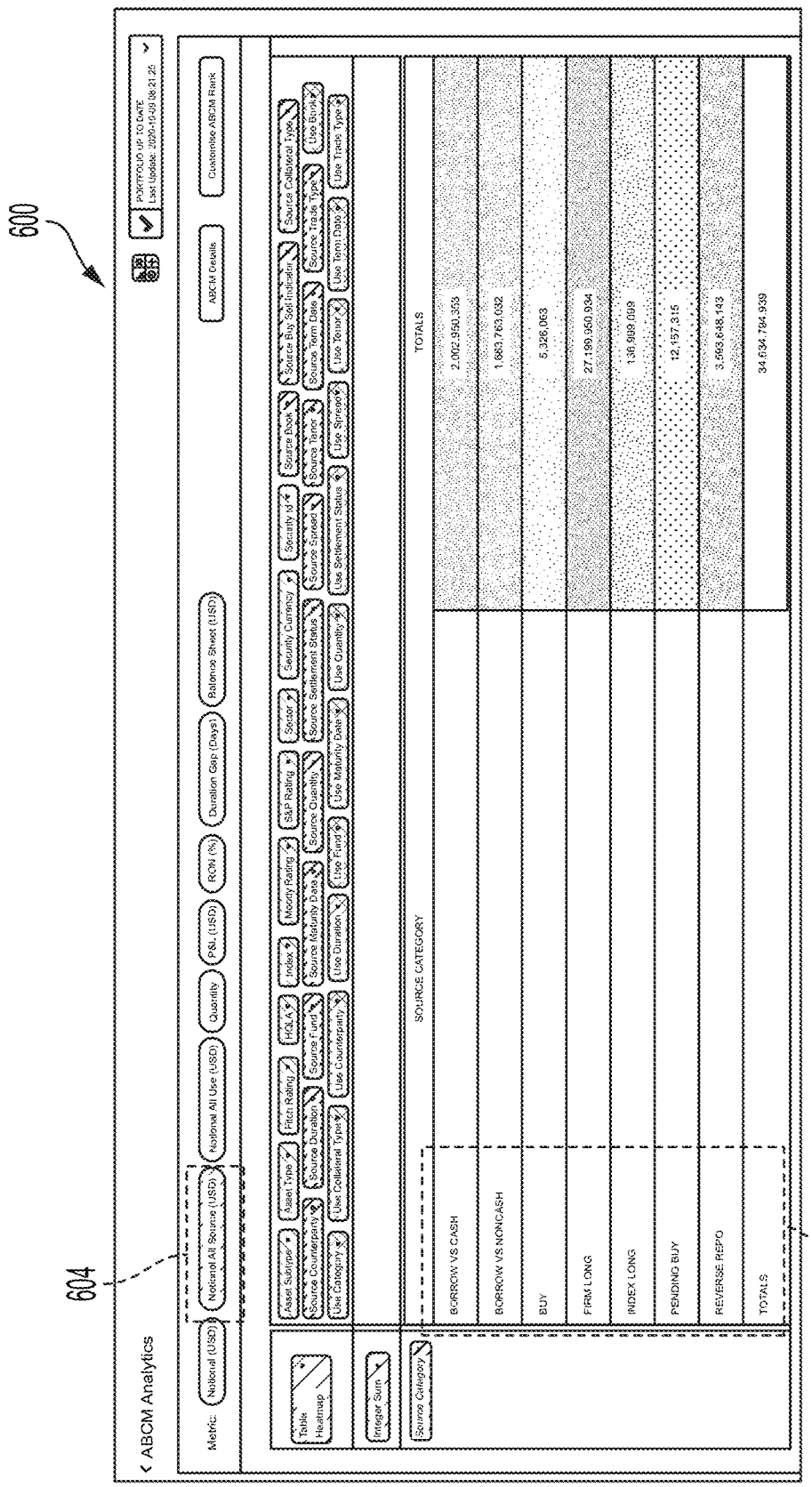

FIG. 4 illustrates an example of a graphical user interface (GUI) 400 according to an embodiment. The GUI 400 includes a dashboard providing access to various system functions, along with a key overview and comprehensive management summary screens. For each of the dashboard features, a heatmap or similar table with further details and actionable tasks (if any) is provided. In an embodiment, the system is configured to determine whether any potential transactions exist (based, for example, on the client configuration and/or details of the client's portfolio). The system may be configured to suggest potential transactions. Responsive to user input, the system may submit one or more transactions to a trading queue. The GUI 400 illustrated in FIG. 4, along with other examples of GUIs described herein, provide examples of how the system may combine various metrics and present a complex, multidimensional portfolio in a comprehensive, easy-to-absorb manner.

Figure 5:
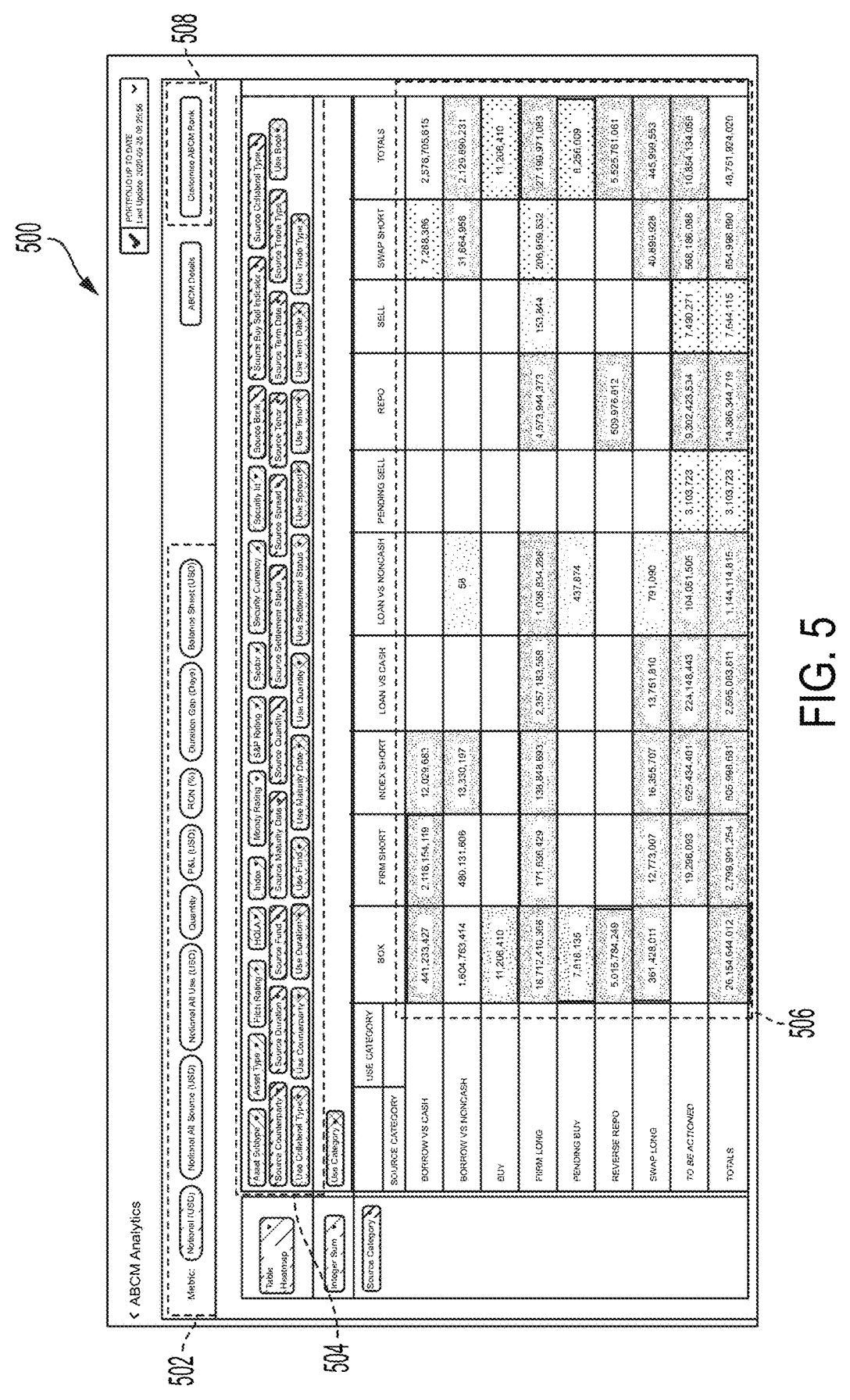

FIG. 5 illustrates an example of a GUI 500 according to an embodiment. A menu bar 502 provides a menu of available option and key metrics for ABCM analysis. The metrics may include, but are not limited to: notional (e.g., broken down into source and use); quantity; profit and loss (P&L); return on notional (RoN); duration gap; and balance sheet. Prior approaches are unable to provide such extensive analytics rapidly and over multiple metrics. Depending on the responsibilities of a client's employees (e.g. portfolio/fund managers, treasurer, operations, sales), the GUI 500 may allow the user to view several metrics very quickly, while simultaneously providing cross-divisional/departmental insights. The system is able to provide a sophisticated analysis of source and use categories. Applying a pivot table format and standards, a user may select from a comprehensive set of factors 504 for source or use purposes. In some examples, more than thirty factors 504 are available for selection.

In an embodiment, a company's book may be broken down into source and use categories. In an example GUI 600 illustrated in FIG. 6, the "Notional All Sources (USD)" metric 604 is selected, and seven sources 602 (of collateral/"assets"), corresponding to a vertical axis, are shown: borrow vs. cash; borrow vs. noncash; buy; firm long; index long; pending buy; and reverse repo.

In an example GUI illustrated in FIG. 7, the "Notional All Use (USD)" metric 704 is selected, and eight uses 702 (of collateral/"liability"), corresponding to a horizontal axis, are shown: firm short; index short; loan vs. cash; loan vs. noncash; pending sell; repo; sell; and swap short. In an embodiment, the system is configured to combine source categories (vertical axis) and use categories (horizontal axis) to generate a matrix display in a pivot table format. Each row, column, and/or cell may be calculated for any key metric(s) selected. Thus, the system may be configured to respond to user input to analyze a client's book and provide insights at a detailed, granular level.

Figure 8:
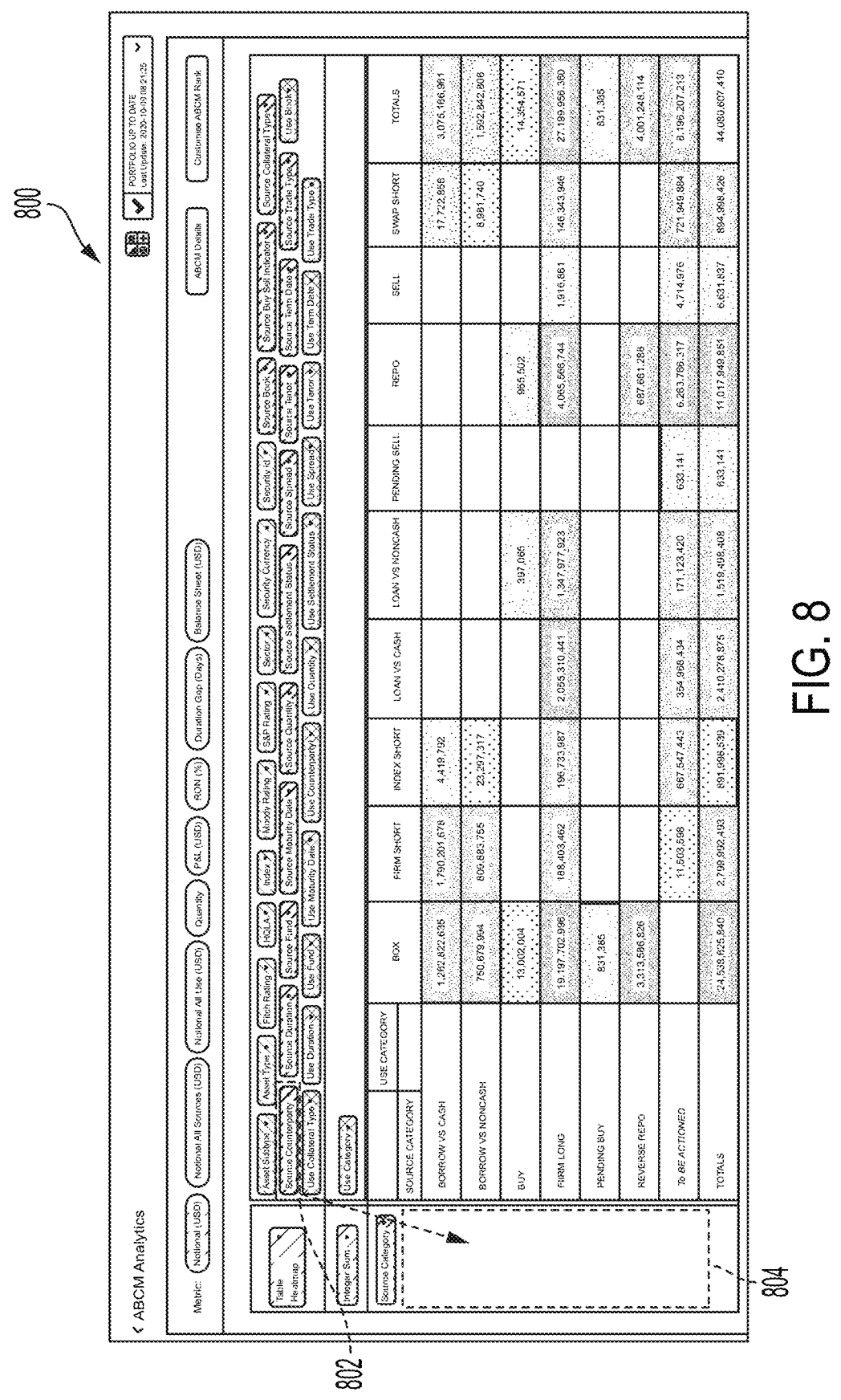
Figure 9:
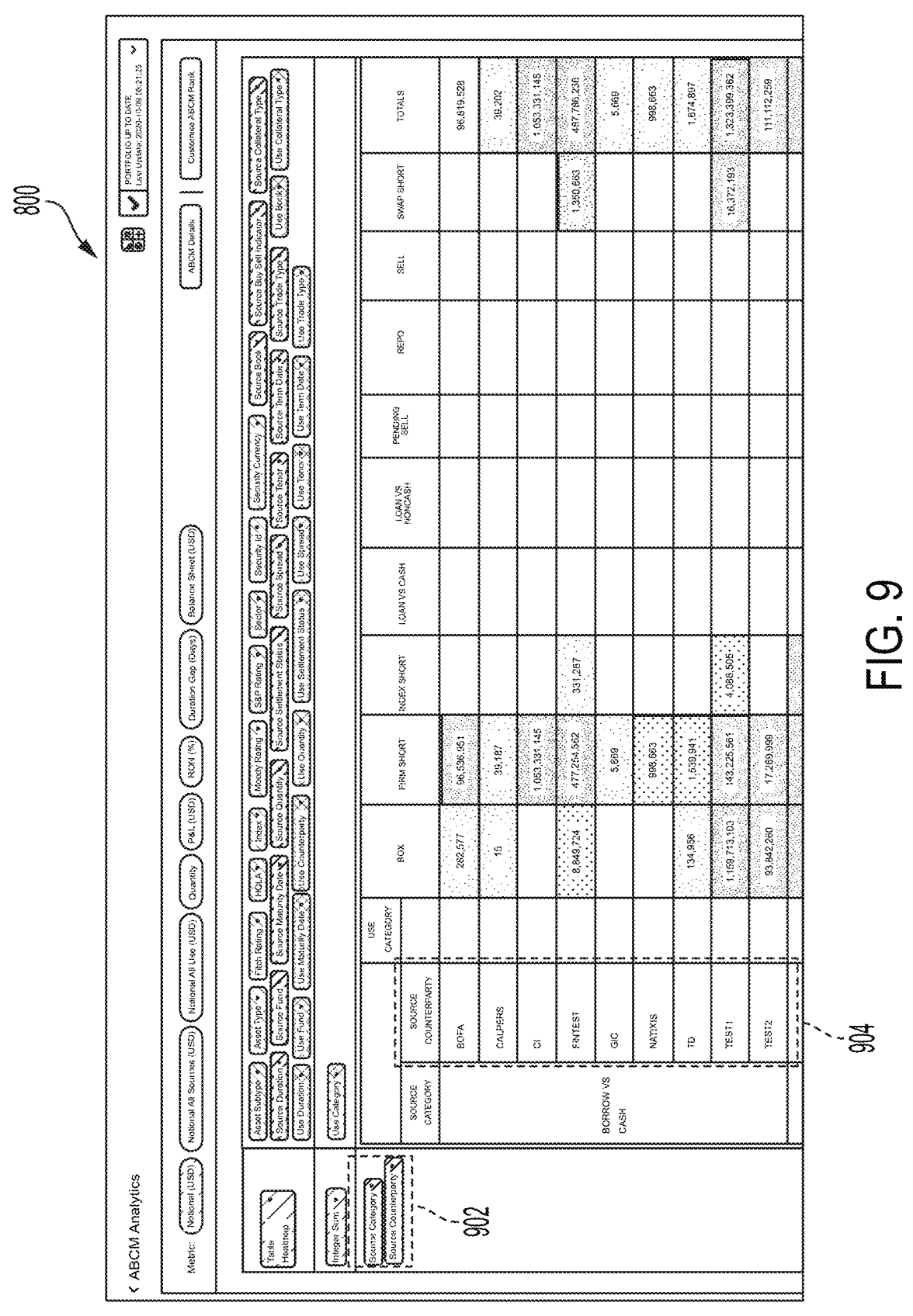

In an embodiment, source and use data can be segregated and analyzed by additional key factors. Such factors may include, but are not limited to: counterparty; rating; duration; maturity or settlement dates; spreads; industry sectors; collateral types, etc. FIGS. 8-9 illustrate an example of a GUI 800 according to an embodiment. In this example, as illustrated in FIG. 8, a user selects "Source Counterparty" 802 and drags it into a drop zone 804. Responsive to the user input, as illustrated in FIG. 9, the system adds "Source Counterparty" to a list of active sources 902. In addition, the system updates the GUI 800 to include a list of counterparties 904. Thus, this example illustrates techniques for showing "source" breakdown by "counterparty," so that the system provides a user with information about their exposure (here notional) for each counterparty they are engaged with. Similar techniques may be applied to different sources.

Returning to discussion of FIG. 5, using techniques describe herein, the system generates a heatmap display 506. The heatmap display 506 includes a color gradient logic (in this example, "the darker, the more exposure") for all key metrics. For a given box/cell/item of the heatmap display 506, the system may be configured to present underlying positions and position details, providing relevant details on a security level.

Figure 10:
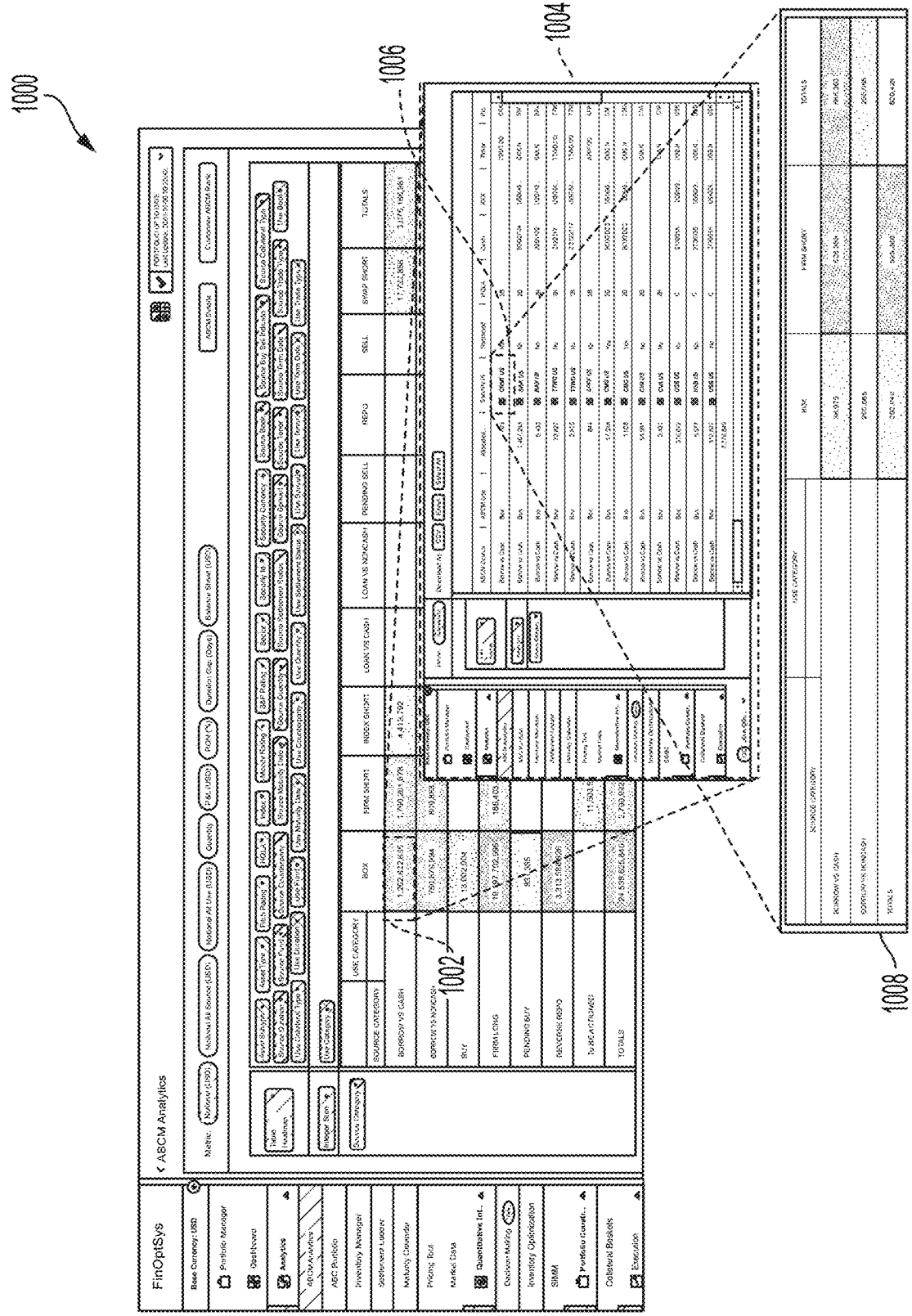

For example, FIG. 10 illustrates a GUI 1000 according to an embodiment. Specifically, FIG. 10 illustrates in-depth drill-down functionality to an individual security level. Responsive to a user clicking or otherwise selecting a heatmap box 1002, the system opens a separate window with a table 1004 that includes corresponding details. Responsive to a user clicking or otherwise selecting a data item 1006 in the table 1004, the system presents security-level detail 1008.

Figure 11:
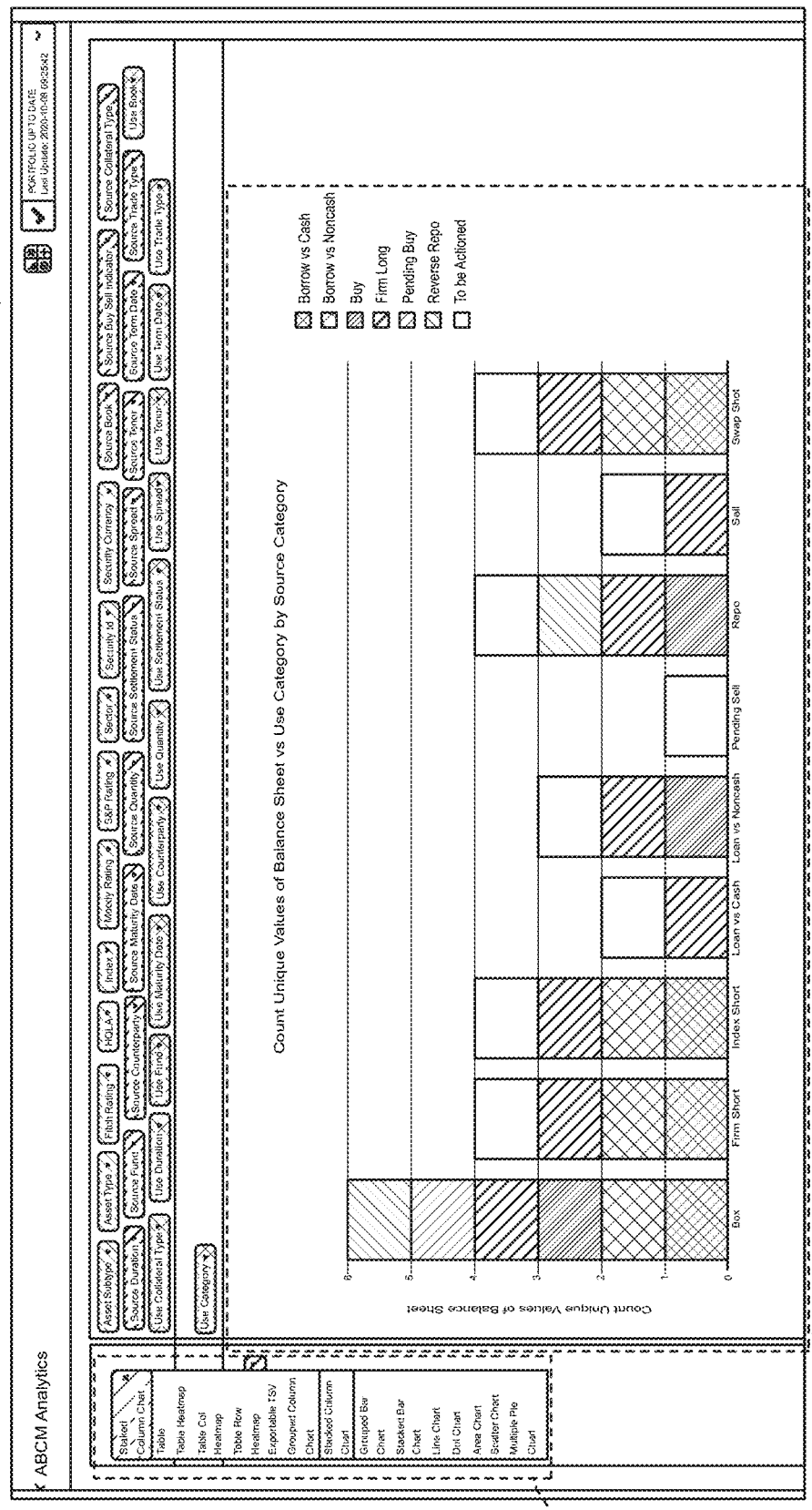

In an embodiment, the system is configured to generate graphical charts. FIG. 11 illustrates an example of a GUI 1100 according to an embodiment. In this example, a set of controls 1102 allows a user to select a kind of chart to generate. Responsive to user input, the system generates one or more corresponding charts 1104.

In an embodiment, the system is configured to receive user input so that each customer has the option of setting their own ABCM rankings for each criterion. Alternatively or additionally, the system may include a default ranking for each criterion. FIG. 12 illustrates an example of a GUI 1200 according to an embodiment. Specifically, the example illustrated in FIG. 12 includes default rankings 1202 for criteria in the "firm long" source. In this example, all "firm long" assets (source category) will first be allocated to cover firm shorts (rank 01). Once all firm shorts are covered, if any firm long assets are still available, they will be allocated to index shorts (rank 02), and so on. The GUI 1200 may include controls that allow a user to supply input to reorder the criteria, thus changing their rankings accordingly. Similar options may be available for other categories and/or criteria. As described herein, allocating assets to liabilities may use a "waterfall" approach, in which the result of a particular allocation affects subsequent allocations, and so on. When a client changes a ranking order, the system may be configured to respond by applying the new prioritization and computing the outcome "on the fly," giving clients the opportunity to view pro forma outcomes right away.

Figure 13:
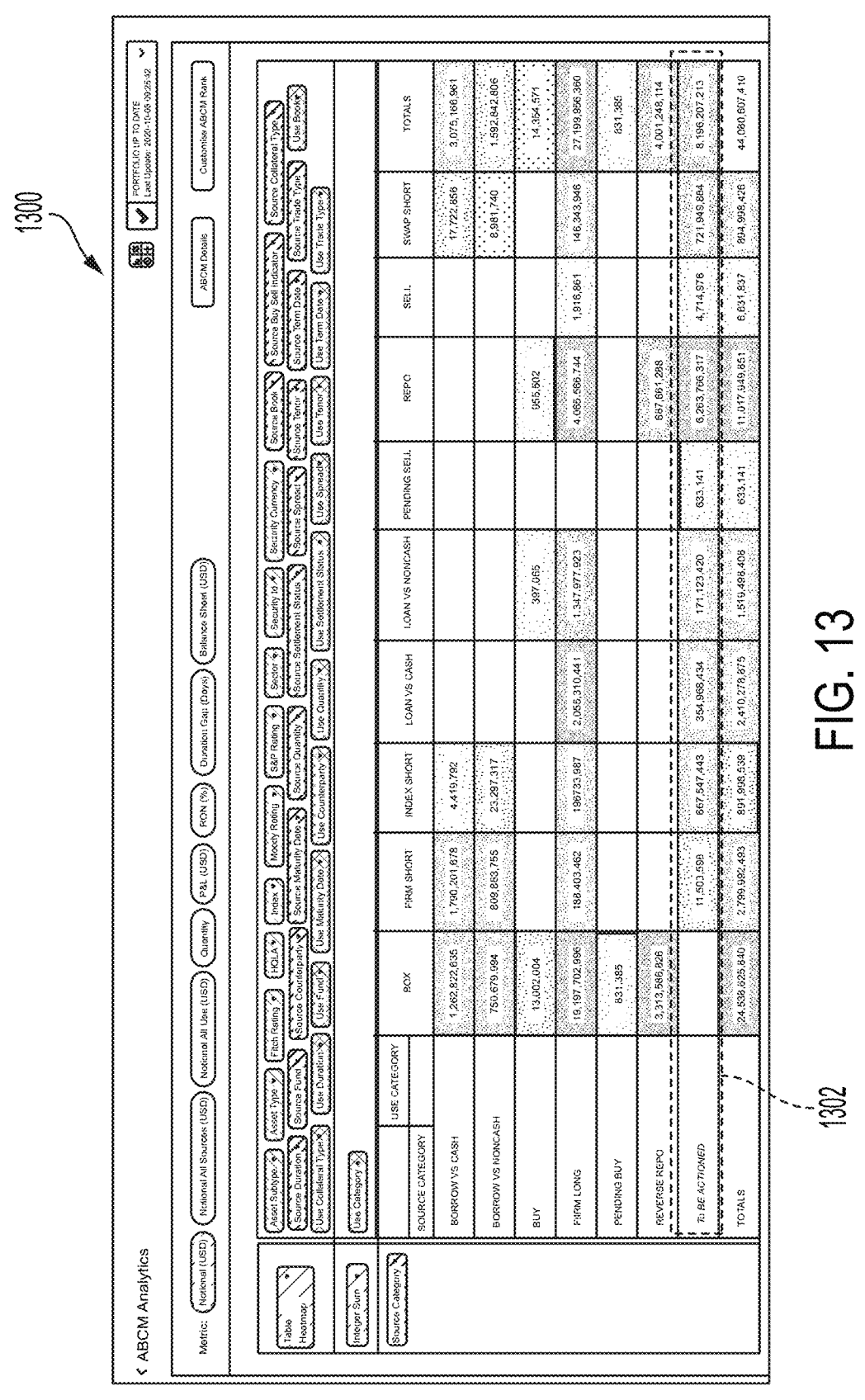

In an embodiment, an ABCM pivot table includes a "to be actioned" row, highlighting one or more recommended actions based on identified inefficiencies. FIG. 13 illustrates an example of a GUI 1300 according to an embodiment. Specifically, as illustrated in FIG. 13, a row 1302 of the table is labeled "TO BE ACTIONED."

In an embodiment, inefficiencies are user-configurable. Specifically, the system may provide a user interface that allows users to customize criteria to determine inefficiencies, in a flexible and discretionary manner. FIG. 14 illustrates an example of a GUI 1400 according to an embodiment, allowing users to customize criteria for determining inefficiencies.

Figure 15:
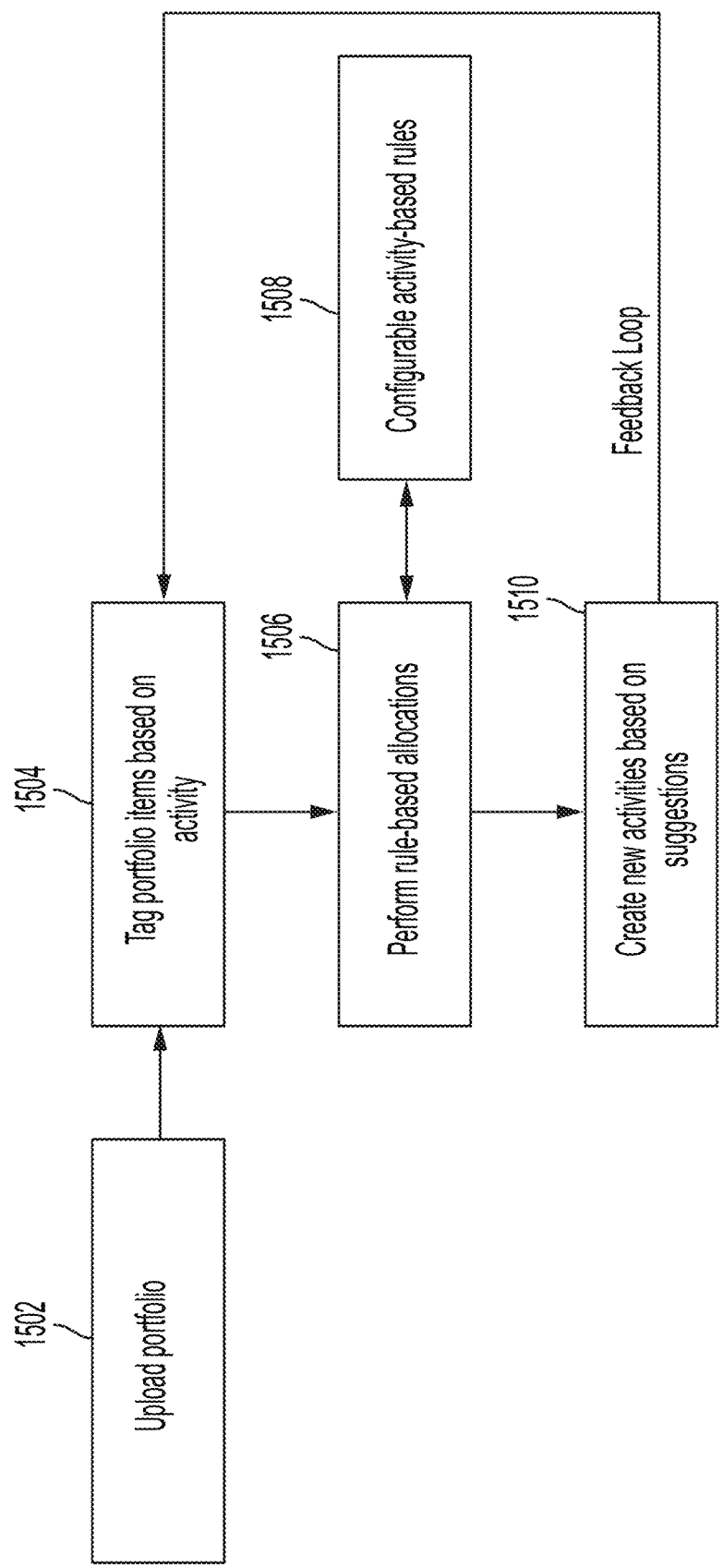
FIG. 15 is a flow diagram of an example of operations for a real-time feedback loop according to an embodiment.

FIG. 15 is a flow diagram of an example of operations for a real-time feedback loop according to an embodiment. One or more operations illustrated in FIG. 15 may be modified, rearranged, or omitted all together. Accordingly, the particular sequence of operations illustrated in FIG. 15 should not be construed as limiting the scope of one or more embodiments. In the following discussion, a "system" may refer to one or more components of a system as illustrated in FIG. 1.

As illustrated in FIG. 15, a system uploads one or more portfolio files (Operation 1502). The system tags portfolio items based on activity (Operation 1504). Activities may be defined as generating assets and/or liabilities (e.g., based on user input and/or automatically based on properties of the activities); these definitions may provide logical "buckets" of assets and liabilities available for ABCM analysis. The system may tag each portfolio line item according to a unique type of source or use activity (e.g., borrow vs. cash, borrow vs. noncash, loan vs. cash or noncash, repo, etc.). In an embodiment, tags help to differentiate activities which can then be used to group them together and to make optimal decisions on those portfolio items. The ABCM module may execute this function, including consolidation on an ongoing basis derived from a feedback loop process as described herein. The system may perform rule-based allocations (Operation 1506). For example, the system may allocate according to ABCM rankings, as described above. Allocating assets to liabilities may use a "waterfall" approach, in which the result of a particular allocation affects subsequent allocations, and so on. Before and/or after applying rule-based allocations, the system may configure activity-based rules (Operation 1508). For example, the system may configure rules responsive to user input to customize client-specific rules, as described above.

Rule-based allocation may provide various improvements, which may include and are not limited to:
 a. Solving inefficiencies, as described above.
 b. Identifying potential profitable trades, which may not be apparent in the absence of rule-based allocation.
 c. Identifying risks, which may include and are not limited to risks associated with duration, credit, and/or exposure.
 d. Understanding balance sheet usage.

In an embodiment, the system creates new activities based on the suggestions generated by the system (Operation 1510). These activities, in turn, provide input to a real-time feedback loop as illustrated in FIG. 15.

4. Miscellaneous; Extensions

In an embodiment, a system includes one or more devices, including one or more hardware processors, that are configured to perform any of the operations described herein and/or recited in any of the claims.

In an embodiment, one or more non-transitory computer-readable storage media store instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

5. Computer Systems and Networks

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 16:
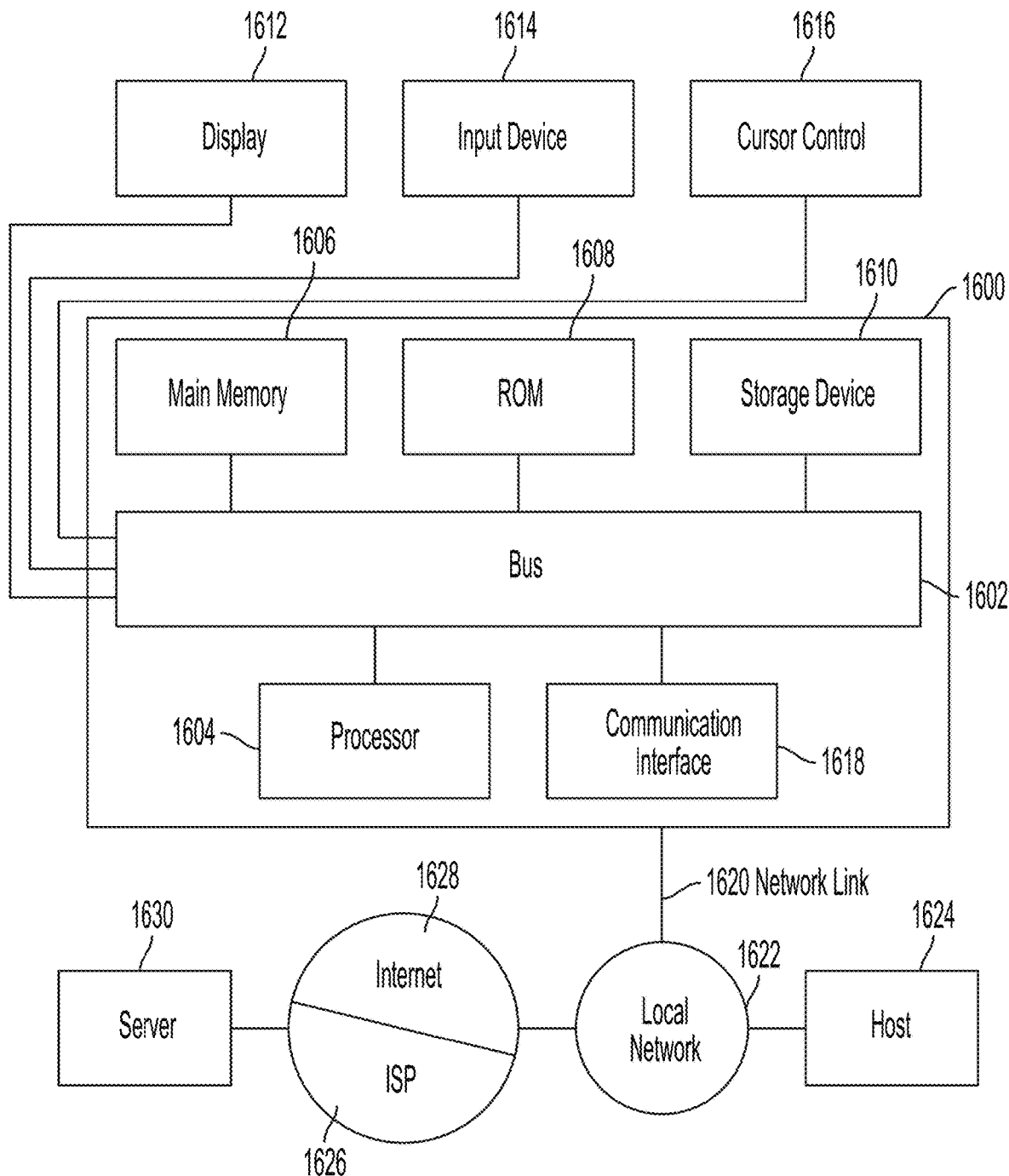
FIG. 16 is a block diagram of an example of a computer system according to an embodiment.

For example, FIG. 16 is a block diagram of an example of a computer system 1600 according to an embodiment. Computer system 1600 includes a bus 1602 or other communication mechanism for communicating information, and a hardware processor 1604 coupled with the bus 1602 for processing information. Hardware processor 1604 may be a general-purpose microprocessor.

Computer system 1600 also includes a main memory 1606, such as a random access memory (RAM) or other dynamic storage device, coupled to bus 1602 for storing information and instructions to be executed by processor 1604. Main memory 1606 also may be used for storing temporary variables or other intermediate information during execution of instructions to be executed by processor 1604. Such instructions, when stored in one or more non-transitory storage media accessible to processor 1604, render computer system 1600 into a special-purpose machine that is customized to perform the operations specified in the instructions.

Computer system 1600 further includes a read only memory (ROM) 1608 or other static storage device coupled to bus 1602 for storing static information and instructions for processor 1604. A storage device 1610, such as a magnetic disk or optical disk, is provided and coupled to bus 1602 for storing information and instructions.

Computer system 1600 may be coupled via bus 1602 to a display 1612, such as a liquid crystal display (LCD), plasma display, electronic ink display, cathode ray tube (CRT) monitor, or any other kind of device for displaying information to a computer user. An input device 1614, including alphanumeric and other keys, may be coupled to bus 1602 for communicating information and command selections to processor 1604. Alternatively or additionally, computer system 1600 may receive user input via a cursor control 1616, such as a mouse, a trackball, a trackpad, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane. Alternatively or additionally, computer system 16 may include a touchscreen. Display 1612 may be configured to receive user input via one or more pressure-sensitive sensors, multi-touch sensors, and/or gesture sensors. Alternatively or additionally, computer system 1600 may receive user input via a microphone, video camera, and/or some other kind of user input device (not shown).

Computer system 1600 may implement the techniques described herein using customized hard-wired logic, one or more ASICs or FPGAs, firmware, and/or program logic which in combination with other components of computer system 1600 causes or programs computer system 1600 to be a special-purpose machine. According to one embodiment, the techniques herein are performed by computer system 1600 in response to processor 1604 executing one or more sequences of one or more instructions contained in main memory 1606. Such instructions may be read into main memory 1606 from another storage medium, such as storage device 1610. Execution of the sequences of instructions contained in main memory 1606 causes processor 1604 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 1610. Volatile media includes dynamic memory, such as main memory 1606. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 1602. Transmission media may also take the form of acoustic or light waves, such as those generated during radio-wave and infra-red data communications.

Various forms of media may be involved in carrying one or more sequences of one or more instructions to processor 1604 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 1600 may receive the data from the network and place the data on bus 1602. Bus 1602 carries the data to main memory 1606, from which processor 1604 retrieves and executes the instructions. The instructions received by main memory 1606 may optionally be stored on storage device 1610 either before or after execution by processor 1604.

Computer system 1600 also includes a communication interface 1618 coupled to bus 1602. Communication interface 1618 provides a two-way data communication coupling to a network link 1620 that is connected to a local network 1622. For example, communication interface 1618 may be an integrated services digital network (ISDN) card, cable modem, satellite modem, or a modem to provide a data communication connection to a corresponding type of telephone line. As another example, communication interface 1618 may be a local area network (LAN) card to provide a data communication connection to a compatible LAN. Wireless links may also be implemented. In any such implementation, communication interface 1618 sends and receives electrical, electromagnetic or optical signals that carry digital data streams representing various types of information.

Network link 1620 typically provides data communication through one or more networks to other data devices. For example, network link 1620 may provide a connection through local network 1622 to a host computer 1624 or to data equipment operated by an Internet Service Provider (ISP) 1626. ISP 1626 in turn provides data communication services through the world wide packet data communication network now commonly referred to as the "Internet" 1628. Local network 1622 and Internet 1628 both use electrical, electromagnetic or optical signals that carry digital data streams. The signals through the various networks and the signals on network link 1620 and through communication interface 1618, which carry the digital data to and from computer system 1600, are example forms of transmission media.

Computer system 1600 can send messages and receive data, including program code, through the network(s), network link 1620 and communication interface 1618. In the Internet example, a server 1630 might transmit a requested code for an application program through Internet 1628, ISP 1626, local network 1622, and communication interface 1618.

The received code may be executed by processor 1604 as it is received, and/or stored in storage device 1610, or other non-volatile storage for later execution.

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread). A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant ID's. Additionally or alternatively, data structures and/or datasets, stored by the computer network, are tagged with tenant ID's. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant ID's of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

What is claimed is:

1. One or more non-transitory computer-readable media storing instructions that, when executed by one or more processors, cause the one or more processors to perform operations comprising:
obtaining portfolio data;
obtaining a ranked plurality of criteria for cross-asset utilization;
performing an activity-based collateral modeling (ABCM) analysis on the portfolio data according to the ranked plurality of criteria for cross-asset utilization, to obtain a set of one or more recommended transactions;
presenting a graphical user interface (GUI) that represents the portfolio data across a plurality of user-selectable dimensions and presents the set of one or more recommended transactions;
receiving user input indicating a decision to execute a transaction in the set of one or more recommended transactions, including identifying a selection of the transaction from a first user of a plurality of users via the GUI; and
responsive to the user input:
placing an instruction to execute the transaction into a trading queue;
updating the portfolio data and the ABCM analysis in real-time to reflect the decision to execute the transaction; and
presenting in real-time a revised GUI that reflects the updated portfolio data and ABCM analysis to a second user of the plurality of users.

2. The one or more non-transitory computer-readable media of claim 1, the operations further comprising:
applying an extract-transform-load process to the portfolio data, to obtain normalized portfolio data.

3. The one or more non-transitory computer-readable media of claim 1, the operations further comprising:
assigning a plurality of tags, respectively, to a plurality of portfolio line items in the portfolio data, according to activity types associated with the plurality of portfolio line items,
the ABCM analysis being configured to reference the plurality of tags.

4. The one or more non-transitory computer-readable media of claim 1, the set of one or more recommended transactions comprising at least one transaction that solves for one or more inefficiencies.

5. The one or more non-transitory computer-readable media of claim 1, the operations further comprising:
allocating assets in the portfolio data to liabilities in the portfolio data, using a waterfall approach in which a first allocation affects a second allocation and the second allocation affects a third allocation.

6. The one or more non-transitory computer-readable media of claim 1, the GUI comprising a heat map representation of the portfolio data across the plurality of user-selectable dimensions.

7. A system comprising:
at least one device including a hardware processor;
the system being configured to perform operations comprising:
obtaining portfolio data;
obtaining a ranked plurality of criteria for cross-asset utilization;
performing an activity-based collateral modeling (ABCM) analysis on the portfolio data according to the ranked plurality of criteria for cross-asset utilization, to obtain a set of one or more recommended transactions;
presenting a graphical user interface (GUI) that represents the portfolio data across a plurality of user-selectable dimensions and presents the set of one or more recommended transactions;
receiving user input indicating a decision to execute a transaction in the set of one or more recommended transactions, including identifying a selection of the transaction from a first user of a plurality of users via the GUI; and
responsive to the user input:
placing an instruction to execute the transaction into a trading queue;
updating the portfolio data and the ABCM analysis in real-time to reflect the decision to execute the transaction; and
presenting in real-time a revised GUI that reflects the updated portfolio data and ABCM analysis to a second user of the plurality of users.

8. The system of claim 7, the operations further comprising:
applying an extract-transform-load process to the portfolio data, to obtain normalized portfolio data.

9. The system of claim 7, the operations further comprising:
assigning a plurality of tags, respectively, to a plurality of portfolio line items in the portfolio data, according to activity types associated with the plurality of portfolio line items,
the ABCM analysis being configured to reference the plurality of tags.

10. The system of claim 7, the set of one or more recommended transactions comprising at least one transaction that solves for one or more inefficiencies.

11. The system of claim 7, the operations further comprising:
allocating assets in the portfolio data to liabilities in the portfolio data, using a waterfall approach in which a first allocation affects a second allocation and the second allocation affects a third allocation.

12. The system of claim 7, the GUI comprising a heat map representation of the portfolio data across the plurality of user-selectable dimensions.

13. A method comprising:
obtaining portfolio data;
obtaining a ranked plurality of criteria for cross-asset utilization;
performing an activity-based collateral modeling (ABCM) analysis on the portfolio data according to the ranked plurality of criteria for cross-asset utilization, to obtain a set of one or more recommended transactions;
presenting a graphical user interface (GUI) that represents the portfolio data across a plurality of user-selectable dimensions and presents the set of one or more recommended transactions;
receiving user input indicating a decision to execute a transaction in the set of one or more recommended transactions, including identifying a selection of the transaction from a first user of a plurality of users via the GUI; and responsive to the user input:
  placing an instruction to execute the transaction into a trading queue;
  updating the portfolio data and the ABCM analysis in real-time to reflect the decision to execute the transaction; and
  presenting in real-time a revised GUI that reflects the updated portfolio data and ABCM analysis to a second user of the plurality of users.

14. The method of claim 13, further comprising:
applying an extract-transform-load process to the portfolio data, to obtain normalized portfolio data.

15. The method of claim 13, further comprising:
assigning a plurality of tags, respectively, to a plurality of portfolio line items in the portfolio data, according to activity types associated with the plurality of portfolio line items,
the ABCM analysis being configured to reference the plurality of tags.

16. The method of claim 13, the set of one or more recommended transactions comprising at least one transaction that solves for one or more inefficiencies.

17. The method of claim 13, the operations further comprising:
allocating assets in the portfolio data to liabilities in the portfolio data, using a waterfall approach in which a first allocation affects a second allocation and the second allocation affects a third allocation.

\* \* \* \* \*